United States Patent Office

3,112,316
Patented Nov. 26, 1963

3,112,316
2-o-CHLOROBENZYLMERCAPTO-4-DIMETHYL-AMINO 5-METHYL PYRIMIDINE
Kurt Westphal and Gerhard Domagk, Wuppertal-Elberfeld, Germany, assignors, by mesne assignments, to Farbenfabriken Bayer Aktiengesellschaft, a corporation of Germany
No Drawing. Filed June 21, 1956, Ser. No. 592,712
Claims priority, application Germany July 5, 1955
1 Claim. (Cl. 260—256.5)

This invention relates in general to novel chemical compounds and to new and improved processes for producing the same. More particularly, the invention contemplates the provision of new thiopyrimidine compounds in conjunction with novel processes for producing these compounds.

The present invention is based upon our discovery that new and valuable compounds of the general class described can be produced:

(a) By reacting 2-halo-4-aminopyrimidines which bear a tertiary amino group, with aralkyl mercaptans and substituted aralkyl mercaptans; or (b) By condensing substituted isothiourea aralkyl ethers with β-ketocarboxylic acid esters, halogenating the resulting 4-hydroxypyrimidines to produce halopyrimidines, and reacting the same with secondary amines; or (c) By reacting 2-mercapto-4-aminopyrimidines which bear a tertiary amino group, with aralkyl compounds and substituted aralkyl compounds that bear, in the aliphatic radical, a substituent suitable for etherification of the 2-mercapto group, and preferably a halogen atom.

The novel compounds of the invention may be represented in general by the following formula:

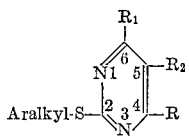

wherein R represents an N-substituted tertiary amino group including nitrogen-containing heterocycles; $R_1$ represents hydrogen or an alkyl radical; and $R_2$ represents hydrogen, halogen or an alkyl radical.

With reference to synthesis (c) above, the thioethers are prepared in conventional manner, i.e., in the presence of alkaline condensing agents such as alkali ethoxide or hydroxide. In accordance with this procedure the formation of N-aralkyl compounds is prevented.

The compounds of the invention possess a unique selective cytostatic activity. Thus, while there are a number of cyostatically-active compounds presently known which are capable of inhibiting growth of tumor cells, the majority of these are either highly toxic or also tend to inhibit growth of normal cells such as the fibroblasts or fibrocytes. The compounds of the invention, on the other hand, possess low toxicity and a highly selective activity against tumor cells, i.e., the fermentative metabolism of the cells. This selective activity has been demonstrated both by in vitro tests and in the treatment of Yoshida-sarcomas in rats and Ehrlich-carcinomas in mice.

In order to facilitate a better understanding of the subject matter of the invention, specific examples follow in which the preparation of typical compounds of the invention by the various routes of synthesis explained above are described. It is to be understood that these examples are provided by way of illustration only and are not to be viewed as imposing limitations upon the invention except as defined within the appended claim.

A. TYPICAL SYNTHESES FROM 2-HALO-4-AMINO-PYRIMIDINES AND ARALKYL MERCAPTANS

Example I

Preparation of the compound 2-benzylmercapto-4-dimethylamino-6-methylpyrimidine, as represented by the formula:

(I)
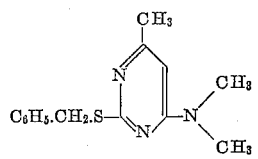

2-chloro-4-dimethylamino - 6 - methylpyrimidine, in amount 17.2 parts, and benzylmercaptan, in amount 12.4 parts, were heated to 195° C. Reaction occurred and the inside temperature rose to 240° C. The reaction product, which solidified upon cooling, was recrystallized from alcohol to yield 16 parts of the hydrochloride of 2-benzylmercapto-4-dimethylamino - 6 - methylpyrimidine in the form of a white, crystalline powder of melting point 194° C.

Example II

Preparation of the compound 2-o-chlorobenzylmercapto-4-N-piperidyl-6-methylpyrimidine, as represented by the formula:

(II)
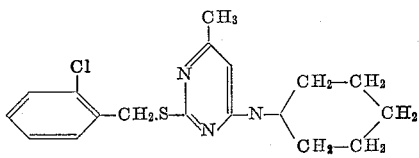

2-chloro-4-N-piperidyl-6-methylpyrimidine, in amount 21.2 parts, and o-chlorobenzyl mercaptan, in amount 15.9 parts, were melted together at 210° C. The resulting reaction product was dissolved in hot alcohol and carefully precipitated with ether. The hydrochloride of 2-o-chlorobenzylmercapto-4-N-piperidyl-6-methylpyrimidine was obtained in a yield of 25.1 parts in the form of a white, crystalline powder of melting point 201–203° C.

Example III

Preparation of the compound 2-o-chlorobenzylmercapto-4-dimethylaminopyrimidine, as represented by the formula:

(III)
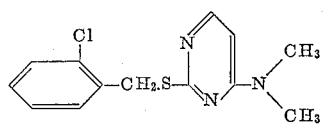

2-chloro-4-dimethylaminopyrimidine, in amount 12.3 parts, and o-chlorobenzyl mercaptan, in amount 12.4 parts, were melted together as described in Example I. The melt was recrystallized from dilute alcohol to yield 10.4 parts of the hydrochloride of 2-o-chlorobenzylmercapto-4-dimethylaminopyrimidine of melting point 233° C.

In the same manner, one obtains hydrochlorides of the compounds:

(a) 2 - o-chlorobenzylmercapto - 4 - dimethylamino - 5-methylprimidine of melting point 216° C., from 2-chloro - 4 - dimethylamino - 5-methylpyrimidine (B.P.$_3$ 161° C.);

(b) 2 - o - chlorobenzylmercapto - 4 - dimethylamino - 6-ethylpyrimidine of melting point 207° C., from 2-chloro - 4 - dimethylamino - 6 - ethylpyrimidine (B.P.$_2$ 127° C.);

(c) 2 - o - chlorobenzylmercapto - 4 - methylamino - 6-methylpyrimidine of melting point 226° C., from 2-chloro - 4 - methylamino - 6 - methylpyrimidine (M.P. 144° C.);

(d) 2 - o - chlorobenzylmercapto - 4 - dimethylamino-5,6-dimethylpyrimidine of melting point 238° C., from 2 - chloro - 4 - dimethylamino-5,6-dimethyl-pyrimidine (B.P.$_2$ 128° C.);

(e) 2 - p - chlorobenzylmercapto - 4 - dimethylamino-6-methylpyrimidine of melting point 221° C.;

(f) 2 - m - chlorobenzylmercapto - 4 - dimethylamino-6-methylpyrimidine of melting point 172° C.; and (g) 2-o-chlorobenzylmercapto-4-dimethylamino-5-chloro-6-methylpyrimidine of melting point 174° C., from 2,5-dichloro - 4-dimethylamino-6-methylpyrimidine (M.P. 77° C.).

*Example IV*

Preparation of the compound 2-β-phenylethylmercapto-4-dimethylamino-6-methylpyrimidine, as represented by the formula:

(IV)

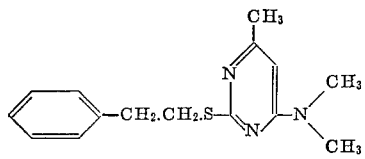

(a) β-Phenylethyl mercaptan, in amount 13.8 parts, and 2 - chloro - 4-dimethylamino-6-methylpyrimidine, in amount 17.1 parts, were melted together at 200° C., and a mild reaction occurred. The reaction product was taken up in hot alcohol and rendered alkaline by means of a sodium hydroxide solution. Following the addition of water, the reaction product was shaken with methylene chloride and the dried methylene chloride residue distilled under vacuum. At 4 mm. pressure and 222° C. the compound 2 - β - phenylethylmercapto - 4-dimethylamino-6-methylpyrimidine distilled over as a water-clear oil which solidified upon standing for some time. The yield was 15.8 parts.

(b) 2-chloro-4-dimethylamino-6-methylpyrimidine, in amount 17.2 grams, and β-phenylethylmercaptan, in amount 13.8 grams, were dissolved in 150 cubic centimeters of pyridine and dropped into a solution of 5 grams of sodium hydroxide and 10 cubic centimeters of water. The temperature of the reaction mixture was maintained below 30° C. by cooling. After several hours the mixture was heated for 30 minutes to 60–70° C. The reaction mixture was then freed from pyridine by reduced pressure, and the residue rendered acid to Congo with hydrochloric acid and then freed from starting material by means of ether. The hydrochloric acid solution was made alkaline and extracted with ether. The dried ether extract boiled at 2 mm. pressure and a temperature of 205–208° C. The compound 2-β-phenylethylmercapto-4-dimethylamino-6-methyl-pyrimidine was obtained as a clear oil which soon solidified.

B. TYPICAL SYNTHESIS BY CONDENSATION OF ISOTHIOUREA-ARALKYL ETHERS WITH β-KETOCARBOXYLIC ACID ESTERS

*Example V*

Preparation of the compound 2-o-chlorobenzylmercapto-4-dimethylamino-6-methylpyrimidine, as represented by the formula:

(V)

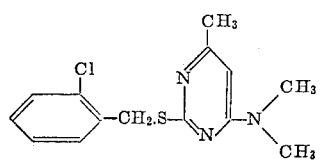

o-Chlorobenzylisothiourea ether hydrochloride (prepared from o-chlorobenzylchloride and thiourea, M.P. 196° C.), in amount 11.7 grams, 100 cubic centimeters of absolute alcohol and 8.5 grams of acetoacetic acid ethyl ester were cooled with ice and slowly dropped into a solution of 2.3 grams of sodium in 100 cubic centimeters of absolute alcohol. After storage for 10 hours, it was refluxed for 2 hours and the solvent then distilled off under vacuum. The residue was taken up in hot water, cleared with animal charcoal and precipitated with a solution of ammonium chloride. Crystals of 2-o-chlorobenzylmercapto-4-hydroxy-6-methylpyrimidine were obtained and melt at 206° C. after recrystallization from alcohol. Seventy-seven (77) grams of this compound were boiled with 50 cubic centimeters of phosphorus oxychloride for one hour. The excess phosphorus oxychloride was distilled off under reduced pressure and the residue taken up in methylene chloride following hydrolysis with water. The dry methylene chloride residue was distilled, and at 3 mm. pressure and a temperature of 190° C., the 2-o-chlorobenzylmercapto-4-chloro - 6 - methylpyrimidine distilled over as a rapidly crystallizing oil. Six and four-tenths (6.4) grams of this chloride were heated in the autoclave with 40 cubic centimeters of alcohol and 20 cubic centimeters of a 10-N-dimethylamine solution for 7 hours at 100–110° C. The reaction product was freed from the solvent in the water-bath, taken up in hot dilute hydrochloric acid and cleared with animal charcoal. Upon cooling, the hydrochloride of 2-o-chlorobenzylmercapto - 4 - dimethylamino-6-methylpyrimidine precipitates in the form of white crystals melting at 226° C.

C. TYPICAL SYNTHESIS FROM 2-MERCAPTO-4-AMINOPYRIMIDINES AND ARALKYL COMPOUNDS SUBSTITUTED IN THE ALIPHATIC GROUP WITH A HALOGEN ATOM

*Example VI*

Preparation of the compound 2-o-chlorobenzylmercapto-4-dimethylamino-6-methylpyrimidine, as represented by Formula V above:

2-mercapto-4-dimethylamino-6-methylpyrimidine (prepared by boiling 2-chloro-4-dimethylamino-6-methylpyrimidine and sodium sulfhydrate in dilute alcohol, M.P. 294° C.), in amount 16.9 grams, was boiled with a solution of 2.3 grams of sodium in 150 cubic centimeters of absolute alcohol and slowly mixed with 16.1 grams of o-chlorobenzyl chloride. After 7 hours, the reaction mixture was freed of alcohol and thoroughly shaken with water and methylene chloride. The residue of the dried methylene chloride extract crystallized. It was dissolved in ethanol, and alcoholic hydrochloric acid added until it reacted acid to Congo paper. The hydrochloride of 2-o - chlorobenzylmercapto - 4-dimethylamino-6-methyl-pyrimidine precipitated in crystalline form and was found to melt at 226° C. after recrystallization from ethanol.

Having thus described the subject matter of our invention, what it is desired to secure by Letters Patent is:

As a new chemical compound, 2-o-chlorobenzylmercapto-4-dimethylamino-5-methylpyrimidine.

References Cited in the file of this patent
UNITED STATES PATENTS

| | | |
|---|---|---|
| 2,455,396 | Adams et al. | Dec. 7, 1948 |
| 2,474,819 | Burchhalter | July 5, 1949 |
| 2,585,906 | Ainley et al. | Feb. 19, 1952 |

OTHER REFERENCES

Polonovski et al.: Bull. Soc. Chem., France (1948), pages 392–5.